United States Patent [19]

Kugimiya et al.

[11] Patent Number: 5,065,318

[45] Date of Patent: Nov. 12, 1991

[54] METHOD OF TRANSLATING A SENTENCE INCLUDING A COMPOUND WORD FORMED BY HYPHENATION USING A TRANSLATING APPARATUS

[75] Inventors: Shuzo Kugimiya, Nara; Yoji Fukumochi, Ikoma; Ichiko Sata, Nara; Tokuyuki Hirai, Yamato-Koriyama; Hitoshi Suzuki, Nara, all of Japan

[73] Assignee: Sharp Kabushiki Kaisha, Osaka, Japan

[21] Appl. No.: 513,254

[22] Filed: Apr. 20, 1990

[30] Foreign Application Priority Data

Apr. 24, 1989 [JP] Japan .................................. 1-104236
Apr. 24, 1989 [JP] Japan .................................. 1-104237

[51] Int. Cl.[5] ........................ G06F 15/38; G06F 1/00; G09B 19/00

[52] U.S. Cl. ..................................... 364/419; 434/156

[58] Field of Search ................ 364/419, 900 MS File, 364/200 MS File; 340/146.3 ED, 146.3 WD; 434/156

[56] References Cited

U.S. PATENT DOCUMENTS 4,373,192 2/1983 Yanagiuchi et al. ................ 364/419
4,456,969 6/1984 Herzik et al. ........................ 364/419
4,890,230 12/1989 Tamoshima et al. ............... 364/419
4,964,030 10/1990 Suzuki et al. ....................... 364/419

FOREIGN PATENT DOCUMENTS 62-163169 7/1987 Japan .
63-106074 5/1988 Japan .

*Primary Examiner*—Dale M. Shaw
*Assistant Examiner*—Xuong M. Chung
*Attorney, Agent, or Firm*—David G. Conlin; Robert F. O'Connell

[57] ABSTRACT

A method of translating a sentence including a compound word formed by hyphenation by using a translating apparatus which includes a dictionary look up and morpheme analyzer for looking up each word constituting an input sentence of a source language in a dictionary and providing a morpheme array of the input sentence from information obtained by looking up the dictionary, a syntax analyzer for analyzing a syntactic structure of the morpheme array provided by the dictionary look up and morpheme analyzer with dictionary and grammatical rules, a language converter for converting the syntactic structure analyzed by the syntax analyzer into a corresponding syntactic structure of a target language, and a language generator for generating a translation in accordance with the syntactic structure of the target language received from the language converter referring to the information obtained by looking up the dictionary.

5 Claims, 9 Drawing Sheets

Fig. 5

| t | h | i | s | | | | |
|---|---|---|---|---|---|---|---|
| i | s | | | | | | |
| a | | | | | | | |
| p | e | n | | | | | |
| . | | | | | | | |

Fig. 6

| | | | |
|---|---|---|---|
| this-- | PRONOUN | DEMONSTRATIVE ADJECTIVE | |
| is -- | VERB | | |
| a -- | ARTICLE | | |
| pen-- | NOUN | | |

Fig. 7
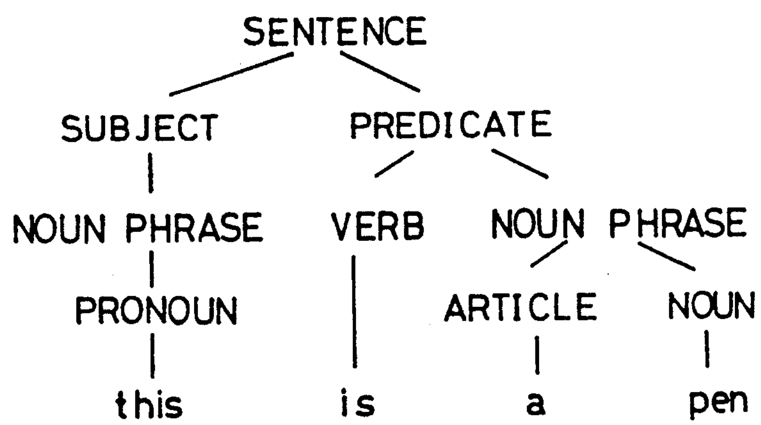
Fig. 8
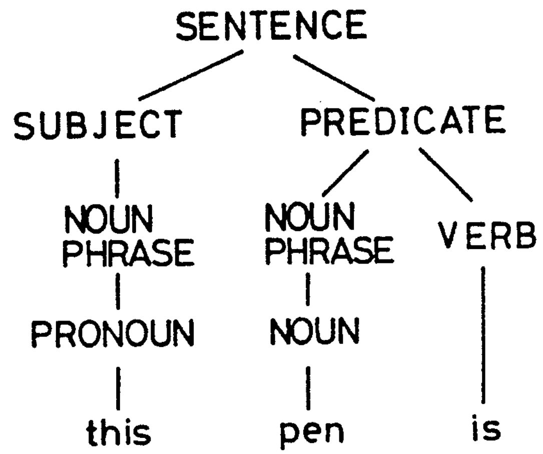
Fig. 9
これはペンである。

Fig. 12
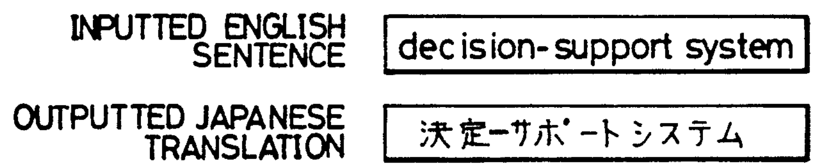
Fig. 13
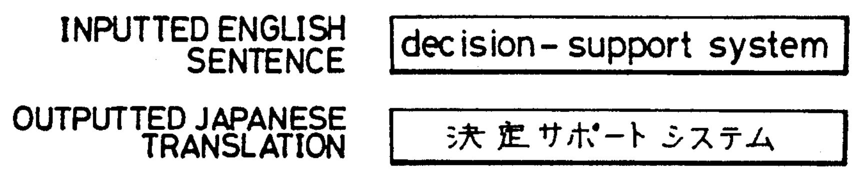
Fig. 14
20
| ORIGINAL WORD AREA (21) | PART OF SPEECH INFORMATION AREA (22) | TRANSLATION AREA (23) | COMPOUND WORD INFORMATION AREA (24) |
|---|---|---|---|
| decision | NOUN | 決定 | 1 |
| support | NOUN | サポート | 2 |
| system | NOUN | システム | 0 |
Fig. 16
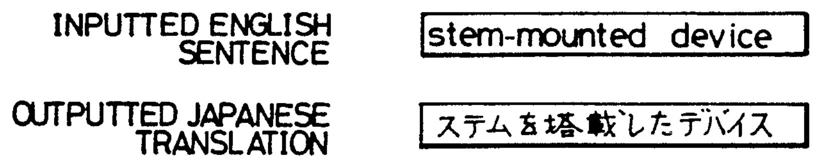

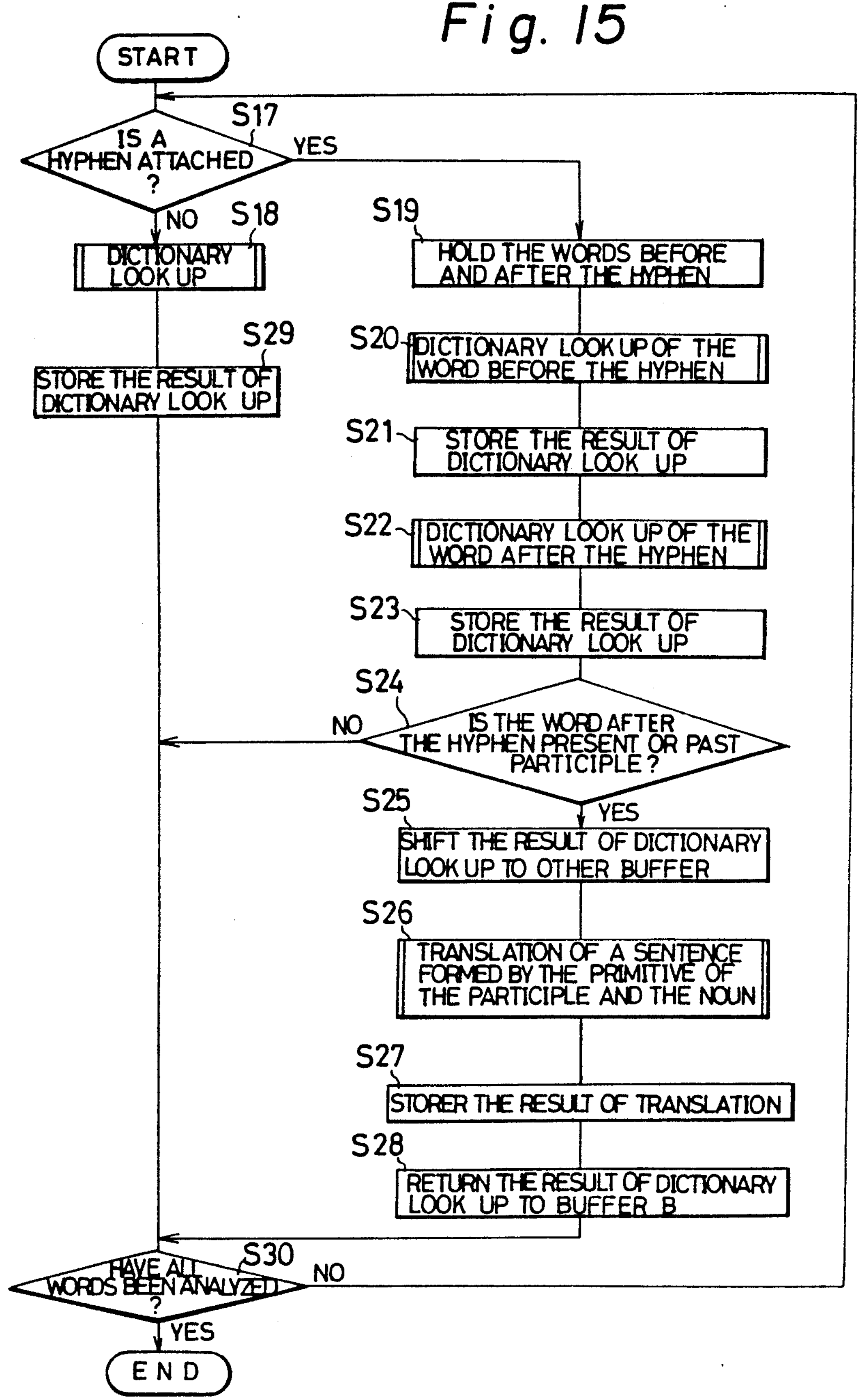

Fig. 15
START
S17
IS A HYPHEN ATTACHED ?
YES
NO
S18
DICTIONARY LOOK UP
S19
HOLD THE WORDS BEFORE AND AFTER THE HYPHEN
S20
DICTIONARY LOOK UP OF THE WORD BEFORE THE HYPHEN
S29
STORE THE RESULT OF DICTIONARY LOOK UP
S21
STORE THE RESULT OF DICTIONARY LOOK UP
S22
DICTIONARY LOOK UP OF THE WORD AFTER THE HYPHEN
S23
STORE THE RESULT OF DICTIONARY LOOK UP
S24
NO
IS THE WORD AFTER THE HYPHEN PRESENT OR PAST PARTICIPLE ?
YES
S25
SHIFT THE RESULT OF DICTIONARY LOOK UP TO OTHER BUFFER
S26
TRANSLATION OF A SENTENCE FORMED BY THE PRIMITIVE OF THE PARTICIPLE AND THE NOUN
S27
STORER THE RESULT OF TRANSLATION
S28
RETURN THE RESULT OF DICTIONARY LOOK UP TO BUFFER B
S30
HAVE ALL WORDS BEEN ANALYZED ?
NO
YES
END

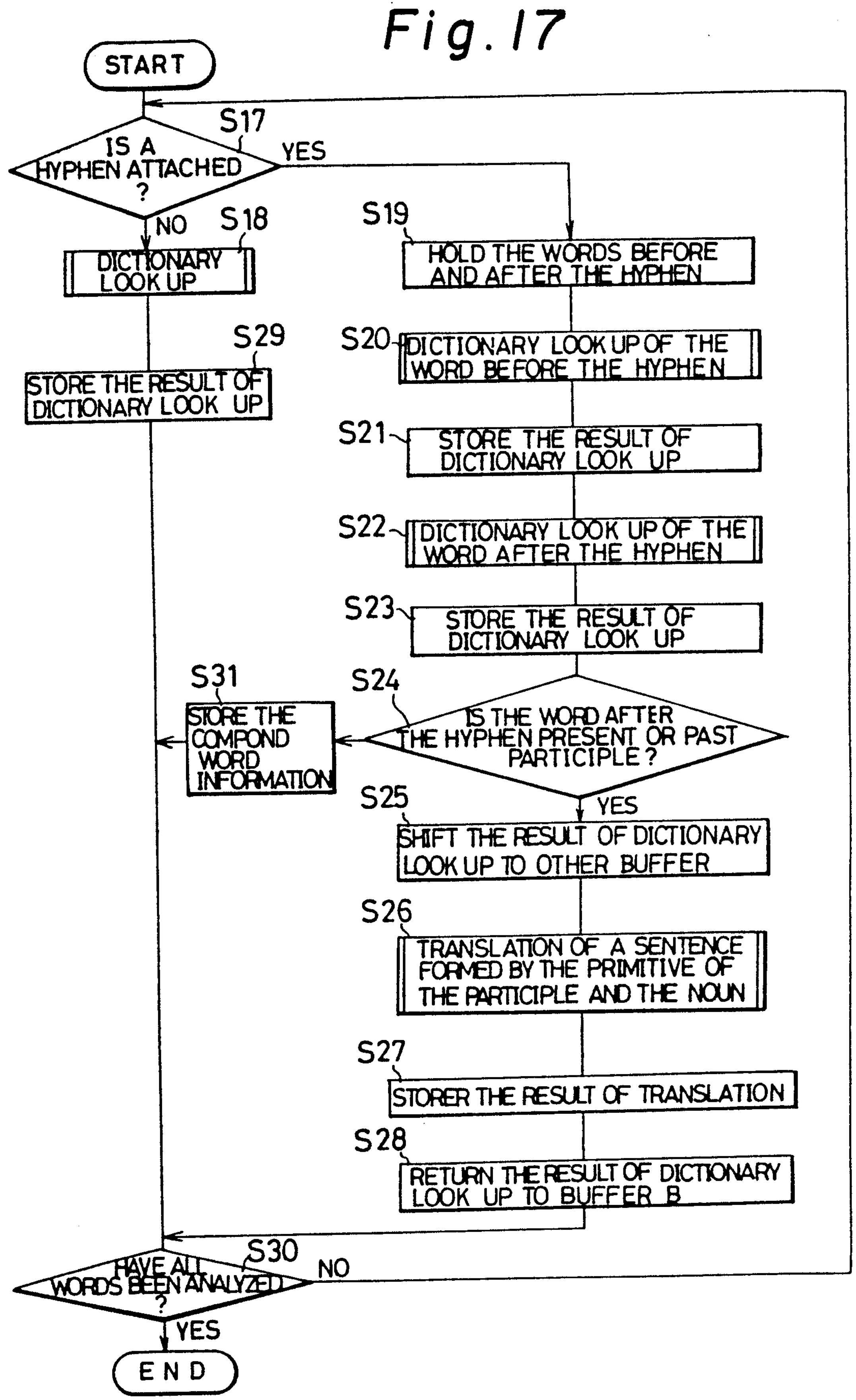
Fig. 17
START
S17
IS A HYPHEN ATTACHED ?
YES
NO
S18
DICTIONARY LOOK UP
S19
HOLD THE WORDS BEFORE AND AFTER THE HYPHEN
S20
DICTIONARY LOOK UP OF THE WORD BEFORE THE HYPHEN
S29
STORE THE RESULT OF DICTIONARY LOOK UP
S21
STORE THE RESULT OF DICTIONARY LOOK UP
S22
DICTIONARY LOOK UP OF THE WORD AFTER THE HYPHEN
S23
STORE THE RESULT OF DICTIONARY LOOK UP
S31
STORE THE COMPOND WORD INFORMATION
S24
IS THE WORD AFTER THE HYPHEN PRESENT OR PAST PARTICIPLE ?
YES
S25
SHIFT THE RESULT OF DICTIONARY LOOK UP TO OTHER BUFFER
S26
TRANSLATION OF A SENTENCE FORMED BY THE PRIMITIVE OF THE PARTICIPLE AND THE NOUN
S27
STORER THE RESULT OF TRANSLATION
S28
RETURN THE RESULT OF DICTIONARY LOOK UP TO BUFFER B
S30
HAVE ALL WORDS BEEN ANALYZED ?
NO
YES
END

METHOD OF TRANSLATING A SENTENCE INCLUDING A COMPOUND WORD FORMED BY HYPHENATION USING A TRANSLATING APPARATUS

BACKGROUND OF THE INVENTION

1. Field of the Invention

The present invention relates to a method of translating a sentence, and more particularly, to a method of translating a sentence including a compound word formed by a hyphen using a translating machine.

2. Description of the Related Art

Conventionally, in translating an English sentence into a Japanese equivalent by a translating machine, if the English sentence includes a compound word consisting of two words hyphenated each other which is not registered in a dictionary, Japanese equivalents to the two words preceding and succeeding a hyphen respectively are separately generated, and the generated Japanese equivalents are outputted without being hyphenated as a Japanese equivalent to the compound word in the form of a series of two separate words. It is therefore very difficult to distinguish whether a part of an outputted Japanese translation, which corresponds to the compound word of the original language, is a compound word formed by hyphenation or one individual word which is registered in the dictionary. This makes understanding of the meaning of the outputted sentence difficult.

Furthermore, in the conventional method, a compound word formed by hyphenation which is not registered in a dictionary is determined as a noun phrase. Hence, a compound word, which consists of a present (or past) participle and a noun coupled to the participle by a hyphen, is determined as a noun phrase if it is not registered in the dictionary though it must be determined as an adjective phrase.

SUMMARY OF THE INVENTION

A first object of the present invention is to provide a method of translating a sentence of a source language including a compound word formed by hyphenation to an equivalent sentence of a target language using a translating apparatus such that the compound word can be recognized as a hyphenated word.

The first object of the present invention can be achieved by a method of translating a sentence by using a translating apparatus which includes dictionary look up and morpheme analyzing means for looking up each word constituting an input sentence of a source language in a dictionary and providing a morpheme array of the input sentence from information obtained by looking up the dictionary, syntax analyzing means for analyzing a syntactic structure of the morpheme array provided by said dictionary look up and morpheme analyzing means with dictionary and grammatical rules, language converting means for converting the syntactic structure analyzed by said syntax analyzing means into a corresponding syntactic structure of a target language, and language generating means for generating a translation in accordance with said syntactic structure of the target language received from said language converting means referring to the information obtained by looking up the dictionary, said method comprising the steps of:

if it is determined that an inputted word of the source language is attached with a hyphen, generating compound word information indicative of said inputted word being a part of a compound word formed by a first and a second words coupled with each other by a hyphen by said dictionary look up and morpheme analyzing means and storing said generated compound word information in a memory while relating said generated compound word information to said inputted word;

if it is determined that the word being related to said compound word information is present by referring to said memory, attaching a hyphen after an equivalent in the target language to said first word; and putting an equivalent in the target language to said second word after said equivalent to said first word.

According to the above-described method, a compound word formed by hyphenation in a sentence of a source language is translated to an equivalent compound word formed by hyphenation of a target language. In consequence, it is possible to recognize the presence of the coined word formed by hyphenation in a translated sentence at a glance of the translated sentence of the target language. This facilitates grasp of the meaning of the equivalent sentence.

A second object of the present invention is to provide a method of correctly translating a sentence of a source language including a compound word consisting of a present (or past) participle and a noun coupled to the participle by a hyphen to an equivalent sentence of a target language with a translating apparatus.

The second object of the present invention can be achieved by a method of translating a sentence by using a translating apparatus which includes dictionary look up and morpheme analyzing means for looking up each word constituting an input sentence of a source language in a dictionary and providing a morpheme array of the input sentence from information obtained by looking up the dictionary, syntax analyzing means for analyzing a syntactic structure of the morpheme array provided by said dictionary look up and morpheme analyzing means with dictionary and grammatical rules, language converting means for converting the syntactic structure analyzed by said syntax analyzing means into a corresponding syntactic structure of a target language, and language generating means for generating a translation in accordance with said syntactic structure of the target language received from said language converting means referring to the information obtained by looking up the dictionary, said method comprising the steps of:

if it is determined that an inputted word of the source language is a compound word formed by a first and a second words coupled with each other by a hyphen, looking up said first and second words individually in the dictionary;

if it is determined that the first word is a noun and the second word is a present or past participle, generating an equivalent in the target language to a sentence formed by a primitive of said present or past participle and said noun located after said participle by said dictionary look up and morpheme analyzing means; and outputting said generated equivalent as a translation of said compound word by said language generating means.

According to the above-described method, even if there exists a compound word in a sentence of a source language, which consists of a present (or past) participle and a noun coupled to the participle by a hyphen which is not registered in a dictionary, the compound word is correctly determined as an adjective phrase, and correct translation of the source language into the target language is made possible.

Further objects and advantages of the present invention will be apparent from the following description, reference being had to the accompanying drawings wherein preferred embodiments of the present invention are clearly shown.

BRIEF DESCRIPTION OF THE DRAWINGS

FIGS. 5 to 9 are views showing the contents of buffers of FIG. 4;

FIGS. 12 and 13 respectively show an English sentence to be translated into Japanese, and Japanese equivalents obtained by the method according to the present invention and by a conventional method respectively;

FIG. 14 is a view showing the contents of the buffer B of FIG. 4;

FIG. 15 is a flowchart explaining the operation of the dictionary look up and morpheme analyzer of FIG. 3 which is constructed in order to achieve the above-described second object of the present invention;

FIG. 16 shows an English sentence to be translated into Japanese and a Japanese equivalent obtained by the method according to the present invention; and FIG. 17 shows a modification of the flowchart of FIG. 15.

DESCRIPTION OF THE PREFERRED EMBODIMENT

Figure 1:
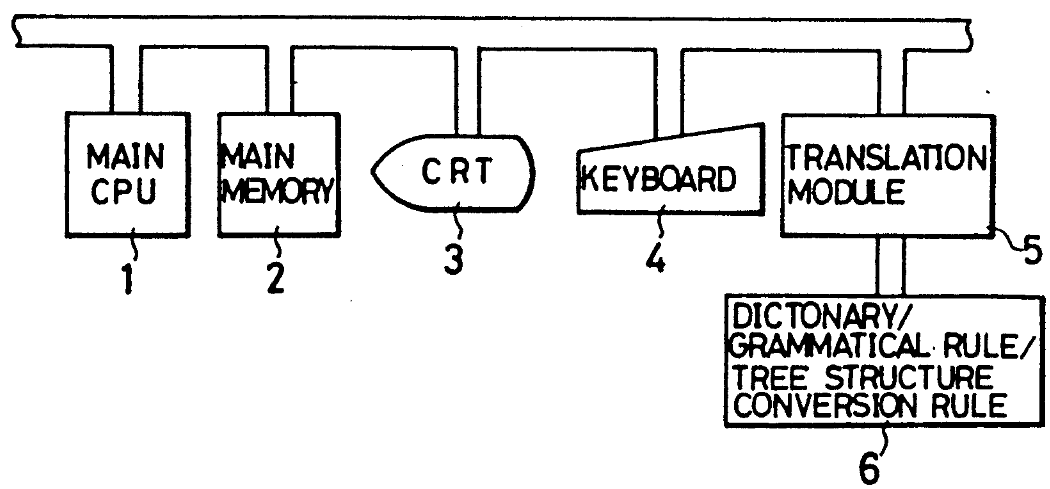
FIG. 1 is a block diagram of an embodiment of a translating apparatus which is used to carry out method according to the present invention.

First, a translating apparatus which is used to carry out the translation method according to the present invention will be described.

The translating apparatus comprises a main central processing unit (main CPU) 1, a main memory 2, a cathode-ray tube (CRT) 3, a key board 4, a translation module 5, and a memory 6 which stores a dictionary for translation, grammatical rules, tree-structure conversion rules, each of which is connected to a data.address control bus 7.

The translation module 5 is arranged to receive a source language, translate it into a corresponding target language, and output this target language. The source language which is inputted through the key board 4 is transferred to the translation module 5 under the control of the main CPU 1. The translation module 5 translates the inputted source language into the corresponding target language by using the dictionary, grammatical rules, tree-structure convention rules stored in the memory 6. The result is temporarily stored in the main memory 2 and is displayed on the CRT 3.

Figure 2:
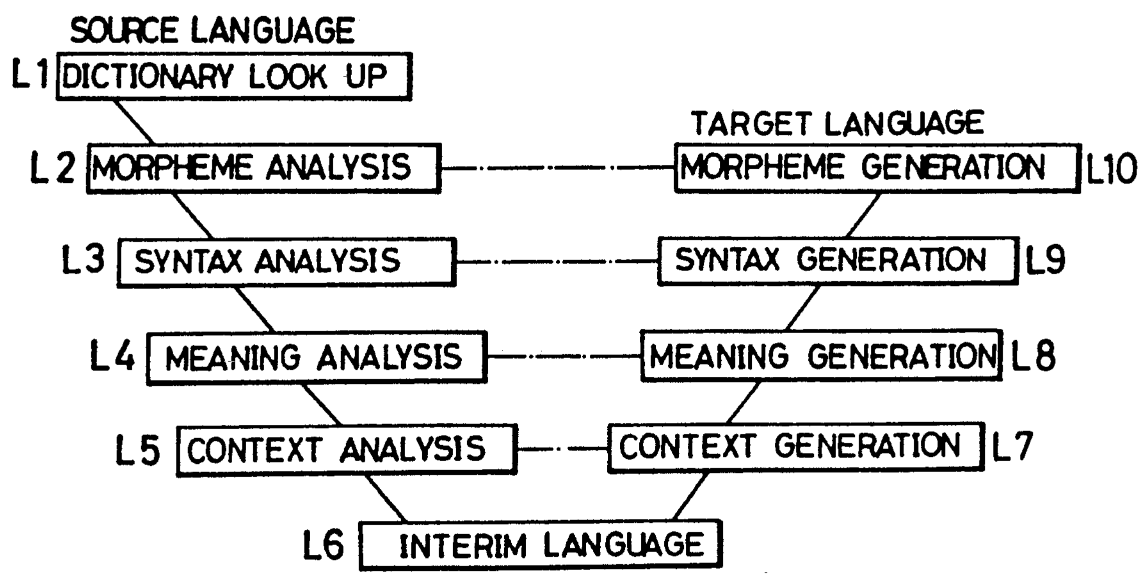
FIG. 2 is an explanatory view of translation levels in automatic translation.

The machine-made translations processed by the translation module 5 generally comprises such analyzing levels as shown in FIG. 2. When a source language is inputted at the top-left part of FIG. 2, the analysis proceeds to level L1 (dictionary look up), level L2 (morpheme analysis), level L3 (syntax analysis) and so on.

Machine-made translation methods are roughly classified into two categories depending on the analyzing levels.

One is called a pivot method in which a source language is analyzed up to level 6 to generate a concept (called the "interim language") which does not depend on the source language or target language, and thereafter, analyses of level L7 (context generation), level L8 (meaning generation), level L9 (syntax generation) and level L10 (morpheme generation) are executed thereby generating the target language.

The other method is called a transfer method which executes analysis up to any one level L2 (morpheme analysis), level L3 (syntax analysis), level L4 (meaning analysis) and level L5 (context analysis) to obtain the internal structure of the source language sentence, and then converts the internal structure into an internal structure of the target language having the same level, thereby generating the target language.

Each of the above analyses will be explained below in more detail.

DICTIONARY LOOK UP AND MORPHEME ANALYSIS

An input sentence is divided into individual morphemes to form a morpheme array (word array) by referring to the dictionary stored in the memory 6. Then, grammatical information, such as a parts of speech and corresponding equivalents are obtained for each word. Further, tense, person, number and the like are analyzed.

SYNTAX ANALYSIS

The structure of the sentence such as a relation among the words (or tree-structure) is determined as explained later.

MEANING ANALYSIS

It is determined which is semantically correct or incorrect from plural results of the syntax analysis.

CONTEXT ANALYSIS

Abbreviation or ambiguity is removed with understanding of the subject of the sentence.

Figure 3:
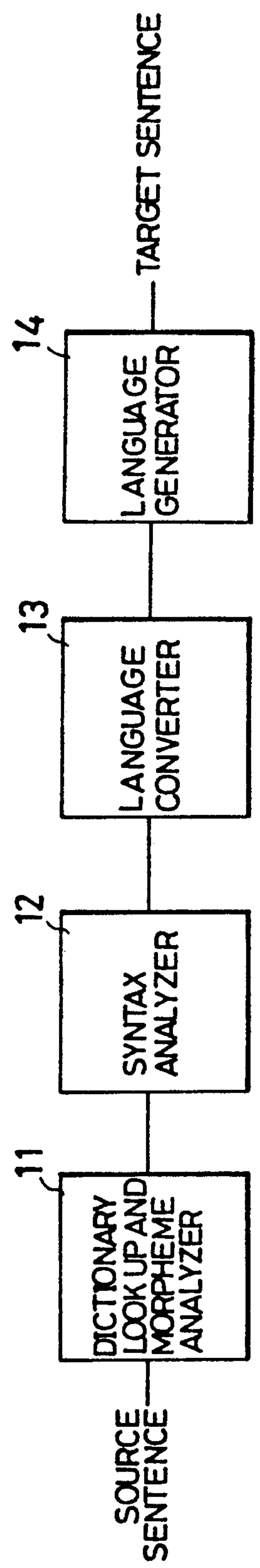
FIG. 3 is a block diagram of a translation module of the translating apparatus of FIG. 1.

The translation module 5 used in the present embodiment performs analysis at least up to level L3, that is up to syntax analysis. Accordingly, the translation module of this embodiment comprises dictionary look up and morpheme analyzer 11, syntax analyzer 12, language converter 13, and language generator 14 as shown in FIG. 3.

Figure 4:
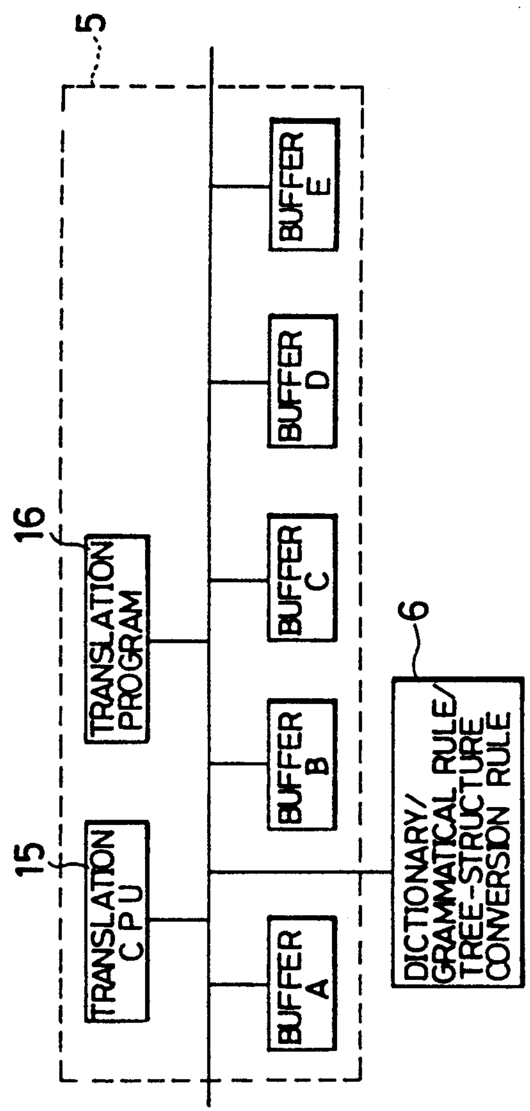
FIG. 4 is a view showing an internal construction of the translation module.

FIG. 4 is a view showing the internal construction of this translation module 5. FIGS. 5 through 9 show the contents of the respective buffers A through E of FIG. 4 which have been utilized to translate an English sentence "This is a pen." into a corresponding Japanese sentence.

At first, the original English sentence is read in the buffer A as shown in FIG. 5. Sequentially, dictionary look up and morpheme analyzer 11 is actuated, and hence, required information on each word of the original sentence stored in the buffer A is identified by using the dictionary stored in the memory 6 under the control of a translation CPU 15 which operates based on a translation program 16, and the identified information is stored in the buffer B as shown in FIG. 6. Although the word "this" is used as several different parts of speech, one of the parts of speech is selected by the syntax analyzer 12. A tree-structure representing relations among the individual words is determined as shown in FIG. 7 in accordance with the dictionary and grammatical rules stored in the memory 6, and the tree-structure is stored in the buffer C. The tree-structure can be determined from the following grammatical rules stored in the memory 6.

sentence→subject and predicate
subject→noun phrase
predicate→verb and noun phrase
noun phrase→pronoun
noun phrase→article and noun The above rules mean, by taking the first rule as an example, "A sentence consists of a subject and a predicate.", which is the same in other rules.

The language converter 13 converts the tree-structure of the inputted English sentence into a tree-structure of a corresponding Japanese sentence as shown in FIG. 8 by using the tree-structure conversion rules stored in the memory 6. The converted tree-structure is stored in the buffer D. The language generator 14 attaches appropriate particles or auxiliary verbs to a Japanese word array obtained from the converted tree-structure thereby forming the Japanese sentence as shown in FIG. 9. The formed Japanese sentence is stored in the buffer E. This Japanese sentence is outputted from the translation module 5 and stored in the main memory 2, and concurrently displayed on the CRT 3.

Next, an embodiment of the translation method which achieves the aforementioned first object of the present invention using the translating apparatus having the above-described construction will now be described with reference to FIGS. 10 to 14.

Figure 10:
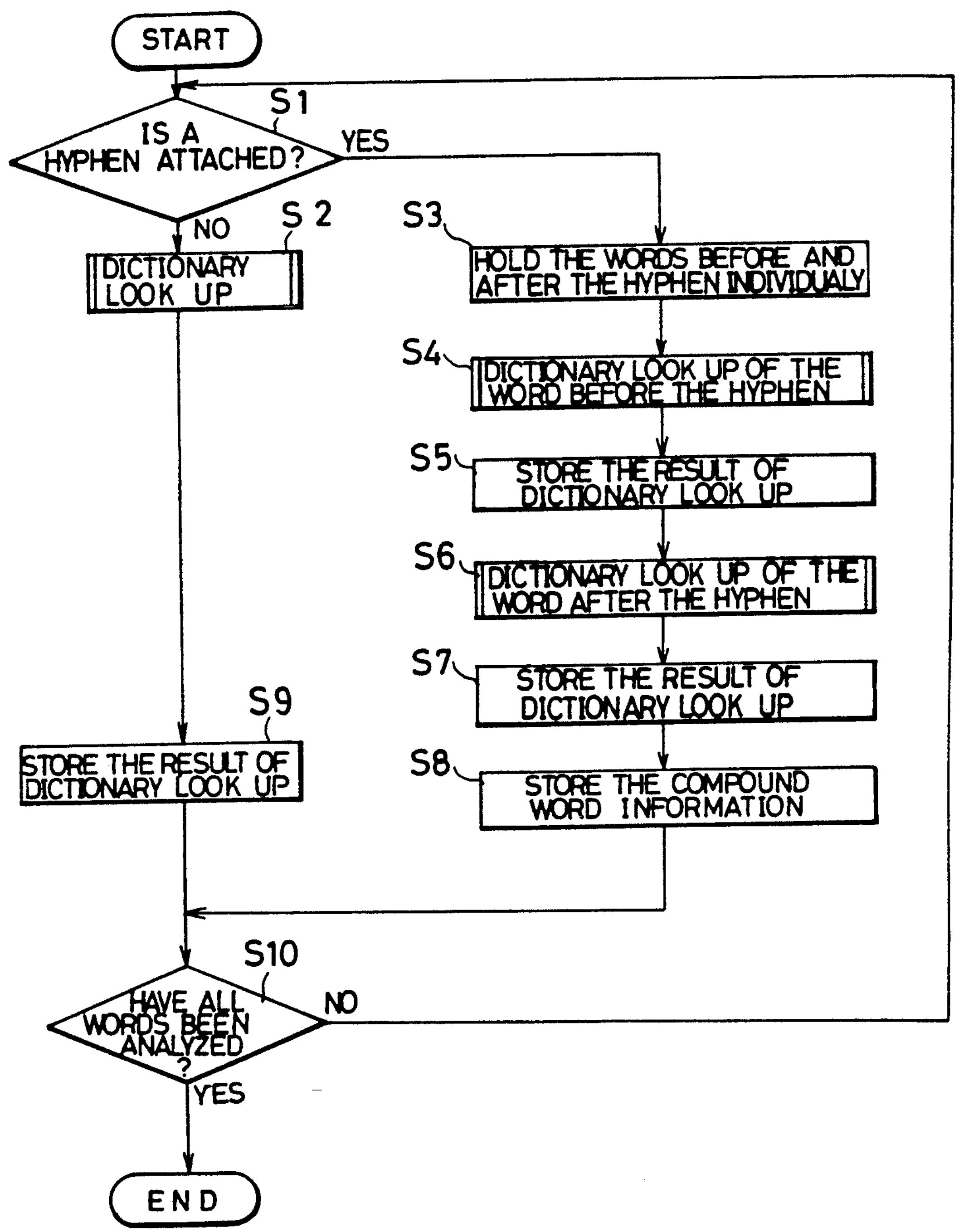
FIGS. 10 and 11 are flowcharts respectively explaining the operation of a dictionary look up and morpheme analyzer and that of a language generator of FIG. 3 which are constructed in order to achieve the above-described first object of the present invention.
Figure 11:
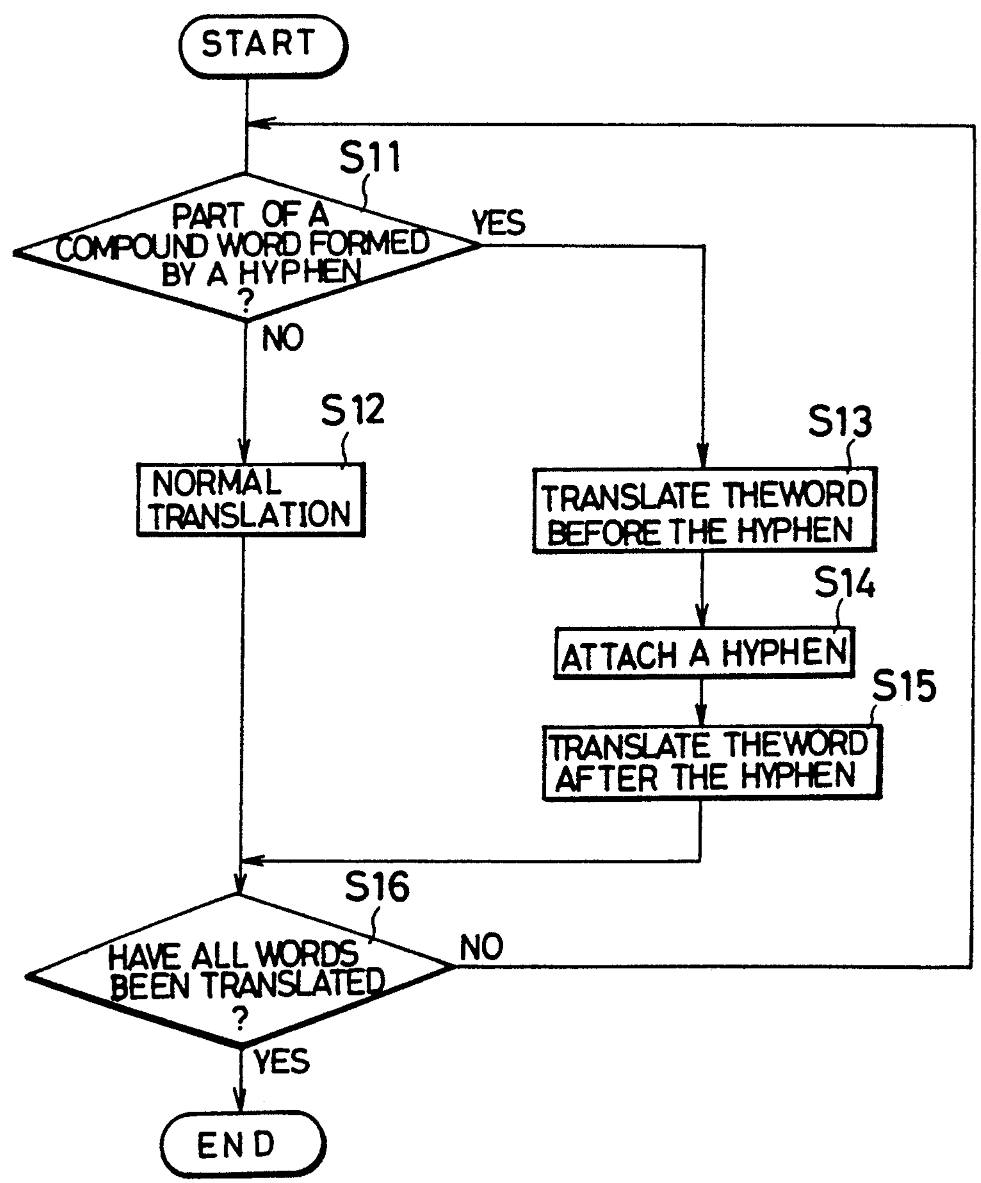

FIGS. 10 and 11 are flowcharts respectively explaining the operation of the dictionary look up and morpheme analyzer 11 and that of the language generator 14 which are constructed in order to achieve the first object of the present invention.

As shown in FIG. 10, it is determined in step S1 whether or not a hyphen is attached to an inputted word by checking codes each corresponded to a word or a character. If a hyphen is attached to the inputted word, two words just before and after this hyphen respectively are individually held in step S3. Next, in step S4, the word preceding the hyphen is looked up in the dictionary and the result of the dictionary look up is stored in the buffer B in step S5. Similarly, the word located subsequently to the hyphen is looked up in the dictionary in step S6, and the result is stored in the buffer B in step S7. Thereafter, in step S8, compound word information representing that these words form a compound word formed by hyphenation is stored in the buffer B.

If it is determined in step S1 that there exists no hyphen attached to the inputted word, a process of normal dictionary look up is performed on this word in step S9, and the result is stored in the buffer B.

The procedure consisting of the above-described steps is repeated until all words in the sentence to be translated are analyzed (step S10).

FIG. 14 shows the contents of a register 20 of the buffer B when the dictionary look up and morpheme analysis represented by the above-described flowchart has been performed on an English sentence "decision-support system".

As shown in FIG. 14, the register 20 comprises an original word area 21, a part of speech information area 22 where a part of speech of an original word is stored, an equivalent word area 23 where a Japanese equivalent to the original word is stored, and a compound word information area 24 where compound word information indicating whether or not the original word is a compound word formed by hyphenation is stored.

"1" in the compound word information area 24 indicates that the word "decision" is a part of a compound word formed by hyphenation and that the word is located just before the hyphen. "2" in the area 24 indicates that the word "support" is a part of the compound word formed by hyphenation and that it is located just after the hyphen. "0" in the area 24 indicates that the word "system" is not a part of the compound word but is an individual word.

The language generator 14 is capable of determining whether or not a word inputted thereto is a part of a compound word formed by hyphenation and whether the word precedes or succeeds the hyphen by referring to the contents of the register 20.

The operation of the language generator 14 will be described with reference to the flowchart of FIG. 11.

When a word is inputted in step S11, it is determined whether or not the words is a part of a compound word formed by hyphenation by checking the contents of the compound word information area 24. If the word is a part of a compound word formed by hyphenation, the process goes to step S13 where a Japanese equivalent to the word just before the hyphen is generated, and a hyphen is attached after this Japanese equivalent in step S14. Practically, a hyphen code corresponding to a hyphen is located after a code corresponding to the Japanese equivalent. Thereafter, in step S15, a Japanese equivalent to the word just after the hyphen is generated and located after the hyphen.

If it is determined in step S11 that the inputted word is not a part of a compound word formed by hyphenation, the process goes to step S12 where normal translation is executed on the word.

The procedure consisting of the above-described steps is repeated until all words in the sentence to be translated are translated (step S16).

FIG. 12 shows an English sentence "decision-support system" to be put into Japanese, and a Japanese equivalent to the English sentence which is obtained by this embodiment of the translation method according to the present invention.

FIG. 13 shows the same English sentence to be put into Japanese, and a Japanese equivalent to this English sentence which is obtained by a conventional translation method.

Since the Japanese equivalent shown in FIG. 12 includes a hyphen, it can be easily understood that "decision" and "support" in combination form one compound word. This facilitates correct grasp of the meaning of the sentence.

An embodiment of the translation method which achieves the second object of the present invention using the aforementioned translating apparatus will now be described below with reference to FIGS. 15 to 17.

FIG. 15 is a flowchart explaining the operation of the dictionary look up and morpheme analyzer 11 which is constructed in order to achieve the second object of the present invention.

As shown in FIG. 15, it is determined in step S17 whether or not a hyphen is attached to an inputted word. If a hyphen is attached to the word, two words preceding and succeeding, the hyphen respectively are looked up individually in a dictionary and their results are stored in the buffer B in steps from S19 to S23 similarly as in steps from S3 to S7 in the flowchart of FIG. 10. Next, it is determined in step S24 whether or not the word following the hyphen is a present (or past) participle. If the word following the hyphen is a present (or past) participle, the process proceeds to step S25 where the result which has been obtained by the dictionary look up and stored in the buffer B are temporarily shifted to another buffer. If the word following the hyphen is not a present or (past) participle, the process goes to step S30.

Subsequently, in step S26, the word preceding the hyphen and the word succeeding the hyphen are exchanged with each other, and thereafter, the translation process is performed assuming that a sentence consisting of the primitive of the present (or past) participle and the noun subsequent to the primitive has been inputted referring to the result of the dictionary look up which has been shifted to another buffer.

Next, in step S27, the result of this translation is stored in the buffer B, and in step S28, the result obtained by the dictionary look up which was shifted to another buffer is then returned to the buffer B.

If it is determined in step S17 that no hyphen is attached to the inputted word, a process of normal dictionary look up is performed on the inputted word in step S18, and the result is stored in the buffer B.

The procedure consisting of the above-described steps, is repeated until all words in the sentence to be translated are analyzed (step S30).

The language generator 14 outputs the Japanese equivalent to the compound word which has been stored in the buffer B in the form of an adjective phrase.

FIG. 16 shows an English sentence "stem-mounted device" to be put into Japanese, and the Japanese equivalent to this English sentence which is obtained by this embodiment.

In a case where it is determined in step S24 that the word following the hyphen is neither the present participle nor the past participle, the compound word of the source language which is formed by hyphenation may be converted to the equivalent compound word of the object language which is formed by hyphenation, as in the case of the embodiment described with reference to FIGS. 10 and 11. In that case, the process of step S31, which is the same as that of step S8 in the flowchart of FIG. 10, is added as shown in FIG. 17.

Many widely different embodiments of the present invention may be constructed without departing from the spirit and scope of the present invention. It should be understood that the present invention is not limited to the specific embodiment described in this specification, except as defined in the appended claims.

What is claimed is:

1. A method of translating a sentence by using a translating apparatus which includes dictionary look up and morpheme analyzing means for looking up each word constituting an input sentence of a source language in a dictionary and providing a morpheme array of the input sentence from information obtained by looking up the dictionary, syntax analyzing means for analyzing a syntactic structure of the morpheme array provided by said dictionary look up and morpheme analyzing means with dictionary and grammatical rules, language converting means for converting the syntactic structure analyzed by said syntax analyzing means into a corresponding syntactic structure of a target language, and language generating means for generating a translation in accordance with said syntactic structure of the target language received from said language converting means referring to the information obtained by looking up the dictionary, said method comprising the steps of:

if it is determined that an inputted word is formed by a first word and a second word coupled with each other by a hyphen, looking up said first and second words individually in the dictionary;

if it is determined that said first word is a noun and said second word is a participle, generating an equivalent sentence in the target language which is formed by a primitive of said participle and said noun located after said participle by said dictionary look up and morpheme analyzing means and storing said generated equivalent sentence in a memory, otherwise generating compound word information indicative of said inputted word being a compound word formed by said first and second words by said dictionary look up and morpheme analyzing means and storing said generated compound word information in said memory while relating said generated compound word information to said inputted word;

if it is determined that a word being related to said compound word information is present by referring to said memory, attaching a hyphen after an equivalent word in the target language to said first word and putting an equivalent word in the target language to said second word after said equivalent word to said first word, otherwise outputting said generated equivalent sentence from said memory as a translation of said inputted word by said language generating means.

2. A method according to claim 1, wherein said source language is English, and said target language is Japanese.

3. A method according to claim 1, wherein said translating apparatus comprises a memory which stores the dictionary, the grammatical rules and tree-structure conversion rules.

4. A method according to claim 1, wherein said dictionary look up and morpheme analyzing means analyzes at least a part of speech, tense, person and number of each word.

5. A method according to claim 1, wherein said translating apparatus comprises a cathode-ray tube for displaying a sentence translated in said target language.

* * * * *